June 11, 1946.    C. F. DALZIEL    2,401,815
ELECTRIC FENCE
Filed June 16, 1942    2 Sheets-Sheet 1
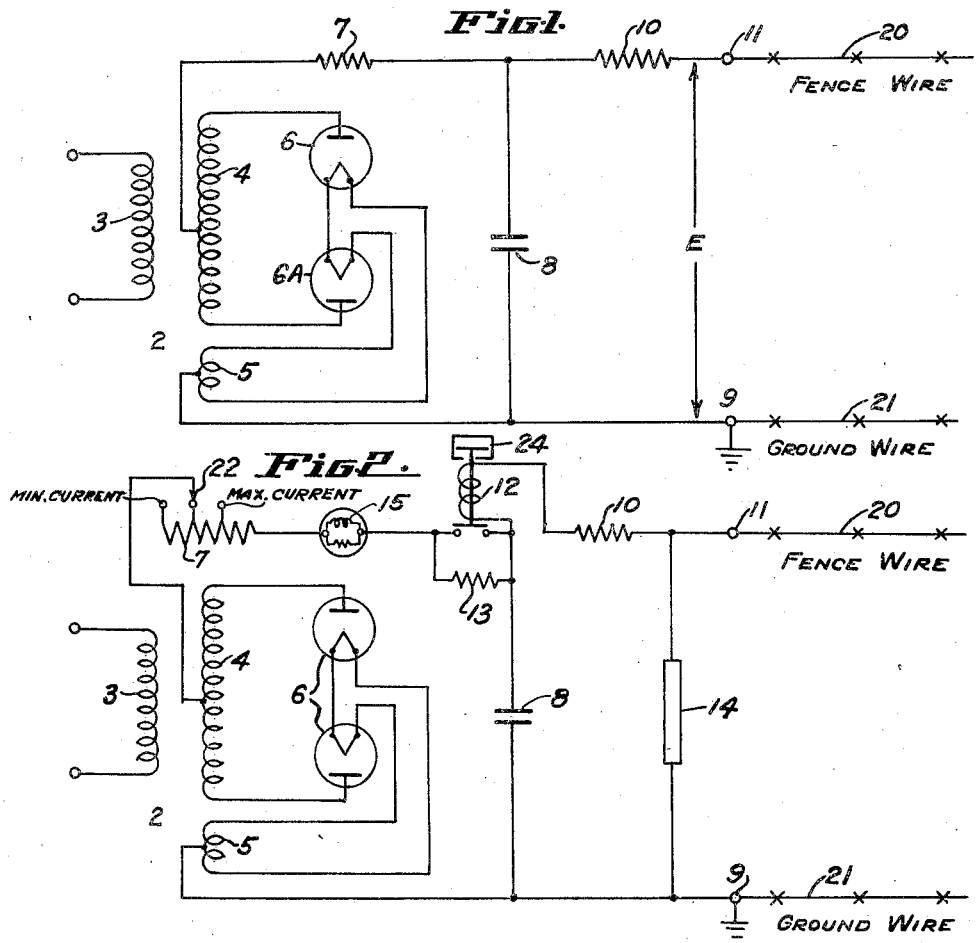
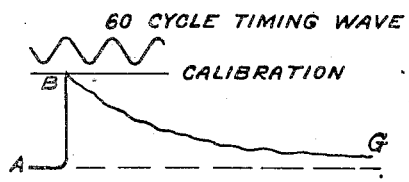
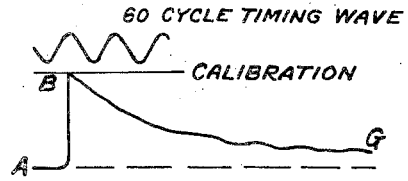
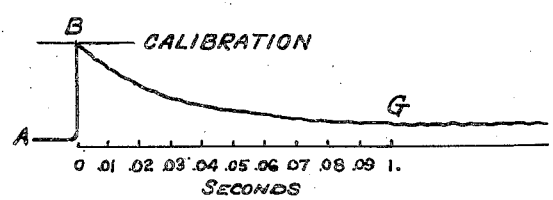
INVENTOR.
CHARLES F. DALZIEL
BY
ATTORNEY.

June 11, 1946.   C. F. DALZIEL   2,401,815
ELECTRIC FENCE
Filed June 16, 1942   2 Sheets-Sheet 2
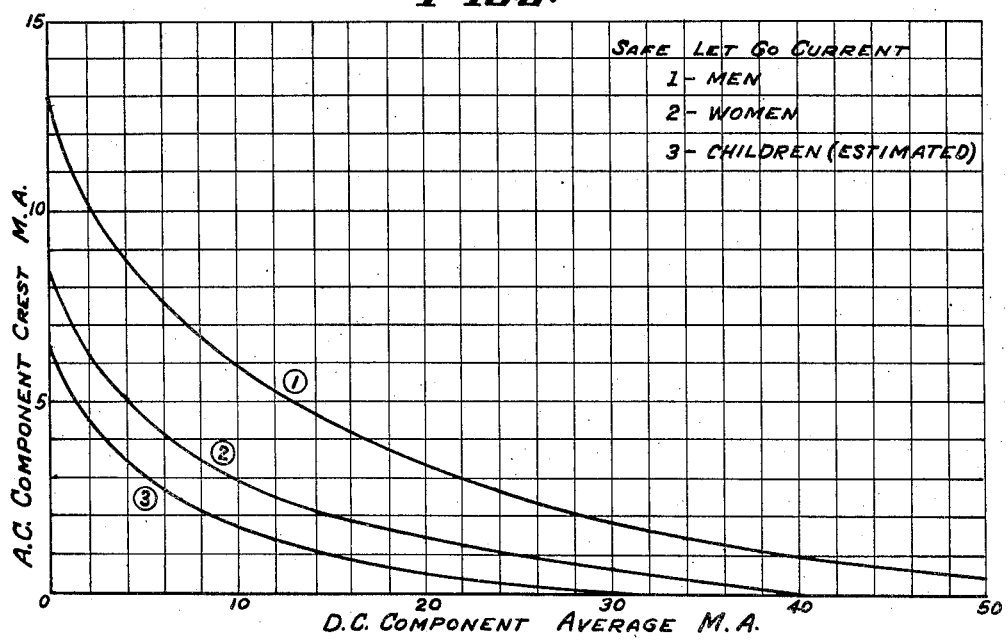
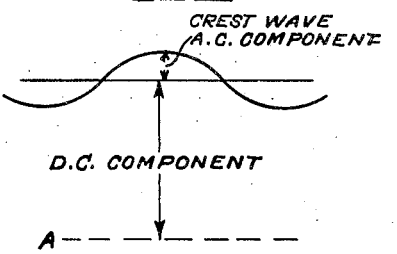
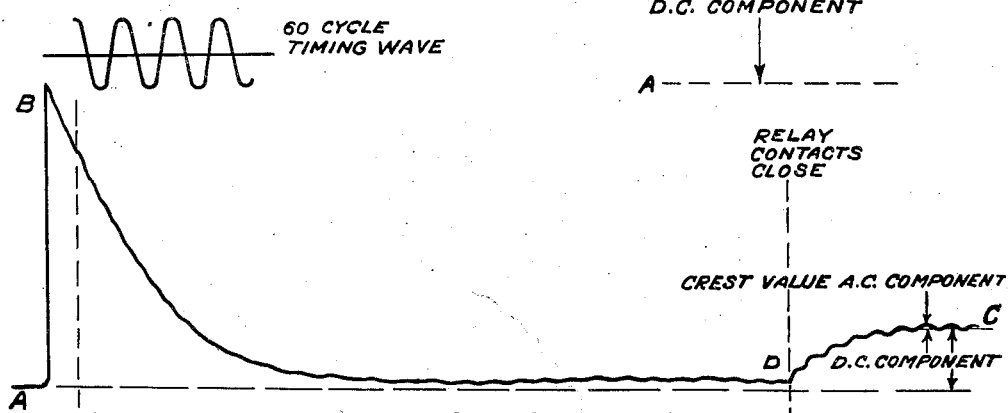
INVENTOR.
CHARLES F. DALZIEL
BY
ATTORNEY.

Patented June 11, 1946

2,401,815

UNITED STATES PATENT OFFICE 2,401,815

ELECTRIC FENCE

Charles F. Dalziel, Berkeley, Calif.

Application June 16, 1942, Serial No. 447,217

8 Claims. (Cl. 256—10)

This invention relates to electric fences, and more particularly to a combination of elements comprising an electric fence controller which allows one and only one single powerful impulse electric shock to be delivered to an animal or human when it contacts the electrically charged fence wire regardless of the duration of the time of contact. Then, if for some reason the animal or human fails to free itself from contact with the fence wire after the first impulse, the sustained shock current is reduced to such a small amount that the effects are harmless, even if endured for a long time. In the combination disclosed, both the initial single impulse shock and the sustained current are harmless to animals and all normal humans including children only two years of age.

It is therefore the object of my invention to provide an electric fence controller having a combination of a transformer, a rectifier, a condenser, a resistor or impeder between the transformer and condenser, and a resistor or impeder between the condenser and the output terminals; to provide the above combination so that upon failure of the rectifier or transformer the condenser will act as a low impedance shunt and reduce the shock received by a victim to a safe value; to provide an electric fence in which the output terminal of negative polarity is connected to the wire fence and not to ground, thereby to increase the efficiency of the device; and to provide an electric fence having in combination a transformer, a rectifier, a condenser and a relay to momentarily sever the power supply when any contact is made with the fence wire, so that after imparting the initial shock upon contact, the current flow drops practically to zero for a considerable period of time after when the relay contacts close and the current gradually increases but is yet limited to a safe value.

These and other objects and advantages accomplished by my invention will become obvious from the following description explaining and illustrating two forms which my invention may take. With this teaching before him, changes and modifications will become clear to the man skilled in the art and it is not my intention to limit the invention to the forms suggested herein, except as required by the claims appended hereto.

Electric fences, or in other words, fences of the type which are electrically charged in order to deliver an electric shock to an animal coming in contact therewith, are well known. Previous to this invention electric fences fell into the following classifications:

1. Non-interrupted alternating current, which is often obtained by connecting to the fence wire the ungrounded 110 volt house circuit in series with a low wattage electric light.

2. Intermittent types:

(a) Intermittent alternating current
(b) Intermittent capacity discharge
(c) Intermittent induction impulse.

The advantages, disadvantages, and hazards of these devices have been pointed out in the technical literature in this art.

The principal objects sought in an electric fence are:

1. To obtain a shock sufficiently effective to control animals regardless of high animal contact resistance, or high ground return circuit resistances and normal leakage currents due to dirty or wet insulators.

2. To obtain a shock reasonably safe to normal men, women and children, and to animals, regardless of contact resistance or ground return circuit resistances or weather conditions or likely failures of the mechanism due to ordinary wear and tear.

3. To meet the requirements of the two national electric codes covering electric fences; with special consideration given to safety and cruelty. This is especially important in the event a human or an animal should be unable to free itself from the electric fence in a reasonably short period of time. The discovery disclosed herein is the result of an extensive research made by the inventor from 1936 to 1942 inclusive involving direct experimentation on approximately 200 men, 28 women, several children, and numerous animals including cows, calves, sheep and hogs.

Actual use has demonstrated that my new single impulse electric fence controller circuit obtains the above important results. In cases where the two national safety codes covering electric fences are not in accord as to details, the most conservative value is satisfied. In addition, where essential electrical safety specifications are not included in the codes, the design contemplates using values determined by the inventor from computations made from experiments on humans and animals.

The accompanying drawings illustrate two complete examples of physical embodiments of the invention constructed according to the best modes so far devised for practical application of the principles thereof, and in which:

Fig. 1 is a diagrammatic illustration of one form of circuit;

Fig. 2 is a diagram similar to Fig. 1 showing a modification of the circuit;

Fig. 3 is an oscillogram showing the current obtained from the device of Fig. 1 when using a full wave high voltage rectifier;

Fig. 4 is an oscillogram showing the current obtained from the device of Fig. 1, using a half wave high voltage rectifier;

Fig. 5 is an oscillogram showing the current passing through a volunteer male subject using the full wave rectifier and device of Fig. 1;

Fig. 6 is a graph showing the safe let-go alternating current and direct current components of humans determined by many laboratory tests; and Fig. 7 is an oscillogram showing the current obtained from the device of Fig. 2.

Fig. 8 is an enlarged view of the right hand portion of the oscillogram shown in Fig. 7.

As used herein, the abbreviations for "alternating current" will be A. C. and for "direct current" will be D. C. Where the word "ground" is used in the specification and claims, it is in its broadest sense and is intended to include a connection to a permanent ground alone, or a connection to a permanent ground and a ground wire 21.

Referring now to Fig. 1 of the accompanying drawings in which like numerals indicate like parts: The fence wire or wires 20, 21 are electrically charged or energized by the electric fence controller, comprising the parts lying to the left of binding posts 9 and 11. In practice, the electric fence controller is preferably housed in a container and located wherever convenient.

The controller includes a transformer 2 having a primary 3 adapted to be connected with a source of alternating current of commercial frequency (110 volts A. C. according to the safety codes) or any suitable alternating current supply desired, and a secondary comprising two windings 4 and 5.

The secondary winding 4 is a high voltage winding and preferably has a center tap. The ends of secondary winding 4 are connected to the anodes of each of two high voltage thermionic rectifier tubes 6 and 6A, and the center tap is connected to resistance or impeder 7. In place of this form of rectifier any other may be employed, having the necessary characteristics.

The secondary winding 5 is a low voltage winding having a center tap. The secondary winding 5 is used to supply the filaments of the rectifier tubes 6 and 6A. The center tap of the secondary winding 5 is connected to condenser 8 and to the ground output terminal at 9.

The unidirectional pulsating output of the high voltage rectifier comprising transformer 2 and the thermionic rectifier tubes 6 and 6A is utilized to store up a charge in condenser 8. The stored charge in the condenser 8 maintains a high voltage between output terminals 9 and 11, the latter being connected to condenser 8 in series with resistance of impeder 10.

The voltage which is built up in condenser 8 by the unidirectional pulsating current supplied from the high voltage rectifier will greatly exceed the R. M. S. value of the rectifier output. This is due to the fact that the condenser, in the absence of any load on the rectifier (assuming perfect insulation between the fence wires), acts as a reservoir and becomes charged to substantially the peak value of the pulsating rectifier output which is usually approximately the square of 2 times the R. M. S. value of the rectifier voltage.

It will be seen, therefore, that it is the function of the high voltage rectifier to provide a unidirectional charging current for condenser 8 to permit storing up a charge therein in excess of the voltage of the charging unit. Any suitable type of rectifier may be used.

I have discovered that a more powerful shock is produced if the negative side output terminal is connected to the fence wire 20, and not to ground 9 or ground wire 21. This is done by suitably connecting the anodes of tubes 6 and 6A to the wire 20 instead of to the ground 21. However, I do not intend to limit myself to the invention in this particular, since it operates satisfactorily where the positive side output terminal is connected to the fence wire 20.

While a full wave rectifier 6, 6A has been illustrated in the drawings and is preferred because of the relatively steady current output, a half wave rectifier may be used. It would comprise one of the tubes 6, for example. The oscillogram of Fig. 4 was made on the basis of performance of such a device. It is obvious that the full wave rectifier may consist of two half wave tubes 6 and 6A, or a full wave rectifier tube having two anodes and one cathode.

In order to carry this current into the field for use, one or more bare wires 20 electrically insulated from ground and placed at a proper height above ground to be effective in controlling animals are connected to output terminal 11. A connection to ground 9 or to ground and also to a second system of bare ground wires 21 installed in proper relation to wires 20 to permit ready contact by animals, are connected to output terminal 9.

The operation of the device of Fig. 1 is as follows: A relatively high voltage is maintained between fence wire 20 and ground or ground wire 21, due to the charge on condenser 8 and to the fact that fence wire or wires 20, 21 of opposite polarity are electrically insulated from each other. Any conducting object coming into electrical contact with fence wires 20, 21 or between the fence wire 20 connected to terminal 11 and the ground will cause condenser 8 to discharge and thus deliver a single impulse shock instantly on contact. Animals receive a shock on each new contact when preceded by a break in contact. If an animal or person retains contact with fence wire 20, the electric impulse rapidly decreases in magnitude to a safe, sustained current from which contact may easily be broken as soon as recovery from the sudden surprise permits voluntary muscular action.

Figs. 3, 4, and 5 show typical oscillograms made with devices constructed in accordance with the invention of Fig. 1, which illustrates the single impulse discharge and the subsequent drop in current to the safe range.

Prior to contact with the fence wire, the current zero line is shown at A. Regardless of how long a human or an animal remains in firm contact with fence wire 20, it receives one and only one powerful shock, illustrated by the instantaneous rise of current to the point B at the moment of contact. The then ensuing safe sustained D. C. and the A. C. ripple produced by the pulsating high voltage rectifier 6, 6A are limited to values safe for animals, humans, and children two years of age. This total safe sustained output current comprising the D. C. and A. C. components is shown at G. See particularly Fig. 7.

The safe or allowable A. C. and D. C. components are shown in Fig. 6. Allowable values of condenser charge, maximum impulse current, sustained D. C. output, and the A. C. content of the sustained output current are obtained and regulated as hereafter stated by proper selection of the no-load voltage across the output terminals 9 and 11, as affected by transformer 2, capacity of condenser 8, and the impedance of impeders 7 and 10.

The advantages of this combination in the single impulse electric fence controller are as follows:

1. Maximum effectiveness: A powerful, short-lived impulse shock current of from 100 to 150 milliamperes crest value (B on Figs. 3, 4 and 5) has been found to give very effective results on cattle. It can be taken by humans without injury.

2. Maximum safety: Then, regardless of how long a person or an animal remains in firm contact with the fence wire, it receives only that one powerful shock because the current flow rapidly drops to a very small and safe value (G on Figs. 3, 4 and 5). This is in striking contrast to the torture of a victim, man or animal, if for some reason it should be unable to free itself from an electric fence energized by any of the so-called "approved" electric fence controllers now in use, especially the intermittent types which repeat the shock with full force at periodical intervals.

3. Also, the victim may easily release its grasp of the fence wire after the current has substantially decreased from its initial value (B in Figs. 3, 4 and 5) and when recovery from sudden surprise permits doing so. An important point is that regardless of the time lag of muscular paralysis and effect on the nervous system caused by the initial shock, the victim will not be subjected to further shocks and may release itself when composure permits. The sustained output current G to which the victim is subjected following the initial shock may be endured for extended periods with no serious effects.

Its effectiveness for animals is important. Most animals pause for a moment before a barrier, and make an investigation with their noses before proceeding. The single impulse fence of my invention delivers one powerful shock, and that one instantly on contact. Therefore, the animal under such circumstances receives the full discharge on its most sensitive (and wet) extremity. Unless the animal is frightened into a rage, experience has shown that it will probably turn back after one or two such shocks, and leave the fence alone.

With the intermittent types of electric fences the animal will receive the shock on first contact of its nose with the wire only if the on-period happens to coincide. If the timing is such that the animal does not receive a shock when its nose contacts the wire, difficulties usually ensue. For example, it may start under the wire and thus receive a shock on its back or tail. In this event, it is likely that instead of being repelled, it may (a) jump clear of the fence in a forward direction, in which case it may be difficult to drive the animal back under the fence at a later time, or (b) be unaffected by the shock due to poor contact.

The controller keeps the fence always on the alert. The potential on the single impulse electric fence of my invention begins to build up at the instant contact with the fence wire is broken. Thus the condenser immediately begins to recharge and quickly becomes ready to deliver a second shock to the same or to a second animal. This is in contrast to the intermittent types wherein the interval or cycle between on-periods is usually .75 to 1.0 second.

The form of my device most preferred today, because it more than meets the regulations of the present safety codes, is shown in Fig. 2.

The present safety codes limit the sustained shock current output of a condenser discharge type of electric fence controller to 3 milliamperes. Experience has shown that this current is insufficient to supply normal insulation leakage currents for the average length of fence now in use. A current of this magnitude is so small that it has been found difficult if not impossible to maintain the fence at a sufficiently high potential to secure effective control of animals, except during perfect operating conditions.

Therefore, the problem has been to provide a device which will give this low current during the normal time interval usually required for a victim to release himself after receiving a shock from the fence wire, but which would permit considerably larger currents to flow during times of excessive insulation leakage and thereby maintain the effectiveness of the device during both favorable and unfavorable operating conditions.

Fig. 7 shows the results obtained with the device of Fig. 2. Note the dip of current output to line D immediately following the single impulse which raised the current to B. If the person or animal retains contact with the fence wire 20, the current will gradually rise to value G, which is identical with the sustained current obtained from the device of Fig. 1 shown in Figs. 3, 4 and 5. It should be pointed out that, except for the most extraordinary circumstances, a person or animal would break contact with the fence wire when the current had decreased to the value D and before the current had begun to increase to value G. If current represented by D is limited to 3 milliamperes, it is so small that it can hardly be felt.

To obtain the current drop to D just described, I provide in the circuit an instantaneous-opening time-delay-closing relay 12.

The purpose of breaking the circuit by relay 12 is to accelerate the rate of collapse of the discharge current from B on Figs. 3, 4 and 5, and 7 to the low value D on Fig. 7. Note that D represents a smaller current than G on Figs. 3, 4, 5 and 7. This adds greatly to the safety of the device. It also materially reduced the fire hazard when contact of inanimate conducting objects creates sparking in the vicinity of combustible materials.

A comparison of Figs. 3, 4 or 5 and Fig. 7 shows the effect of the relay in limiting the safe sustained shock current during the time delay provided by relay 12. After the relay contacts close, the current gradually increases, still within the safe range, to its final value 0.

Impeder 13 is connected across the contacts of relay 12 to increase the effectiveness of the controller during times of low fence leakage current by permitting condenser 8 to recharge immediately as soon as an animal breaks contact with the fence wire, without having to wait for the relay contacts to close. The resistance of impeder 13 is such that it feeds a little, but not much current to fence wire 20. Thus the current D is not quite zero. However, it permits condenser 8 to recharge once contact with the fence is broken and the fence rapidly becomes ready to deliver a shock to the same or a second animal regardless of the time delay provided by the relay.

The modification of Fig. 2 also provides an indicator 15 to tell the operating condition of the electric fence controller and electric fence wires, and a lightning arrester 14, but these in no way alter the fundamental principle of operation.

It is realized that it is impractical to provide adequate protection against direct lightning strokes for any device of this kind. The small lightning arrester 14 connected directly across the output terminals 9 and 11 will, however, protect condenser 8 from minor static disturbances and the effects of distant lightning discharges. The principal purpose of said arrester is to protect and prolong the life of a condenser 8 and thereby reduce maintenance costs.

Indicator 15 is inserted to give an indication of the operating condition of the controller and the leakage resistance of the insulated fence wire 20 to ground 9 and ground wire 21. The indicator may consist of a milliammeter with a scale marked to indicate leakage current in milliamperes. It may be marked to indicate the approximate condition of the fence insulation from ground such as: perfect, good, average, and short circuited. Or, the indicator may be a small neon light which indicates only short circuits. The indicator also provides an indication in the event either condenser 8 or lightning arrester 14 becomes short circuited. The purpose of the indicator is to provide a visual indication of the electrical conditions existing in the controller or along the fence as an aid in maintaining proper operation.

It is desirable to provide a transparent cover over the controller assembly so that certain moving parts of relay 12 will be visible to an attendant. Operation of the relay, as hereafter disclosed, indicates proper functioning of the controller when good contact is made with the fence wire. Failure of the relay to operate when a shock is produced by contacting the fence wire indicates the presence of a defect in the controller, such as an open circuited condenser. Thus a ready means of ascertaining proper operating conditions are provided. This is of value in regular field inspection of controller installations.

The following pertains to the operation and selection of the parts combined in this device:

It is important that the fence wire 20 or wires 20 and 21 be maintained at a high potential so as to produce sufficient shock to control animals regardless of wide variations in ground resistance and contact resistance of the animal. This is accomplished by carefully choosing a suitable voltage for the transformer secondary winding 4 and the correct values for impeders 7, 10 and condenser 8, so that the fence is maintained at a relatively high voltage irrespective of ordinary fence insulator leakage currents.

Very high voltages are likely to cause insulation problems and excessive leakage currents, and due to the limited output, this might result in a low fence voltage and give unsatisfactory operation. The safety codes do not specify a voltage limitation, but in view of the above I prefer a combination of coil, impeders, rectifier and condenser which will produce a maximum no-load D. C. output voltage E between terminals 9 and 11 of 1000 to 3000 volts.

Thus, when there is contact with the fence, condenser 8 discharges, instantly producing an impulse shock of B intensity to the animal or human. The relay 12 operates, disconnecting the source of power supply, and the stored energy of condenser 8 discharges through impeder 10 and the animal, producing the single powerful shock B.

The safety codes today limit the maximum stored energy of condenser 8 to $3 \times 10^{-3}$ coulomb. The capacity of condenser 8 is determined from the relation, $C = Q/E$, in which $C$ = capacity of condenser 8 in farads, $Q$ = charge in coulombs, and $E$ = output voltage defined in the paragraph above.

The maximum impulse current B is limited to a safe value by impeder 10. This current must not exceed 150 milliamperes when the fence terminals 9 and 11 are connected through a 500 ohm non-inductive resistor, the test conditions specified by the safety codes. If impeder 10 is non-inductive, and impedance of the coil in relay 12 is relatively small, an approximate and conservative value is determined from the relation $R = E/I$, in which $R$ = resistance of impeder 10 in ohms, $I$ = crest value of impulse current and $E$ = D. C. no load output voltage across terminals 9 and 11.

Safety code requirements for prior art intermittent electric fence controllers specify an on-period for the intermittent impulse shock current not to exceed 0.05 to 0.10 second followed by an off-period of 0.75 to 1.0 second. Therefore, in my single impulse device, relay 12 should be equipped with a suitable escapement mechanism or other timing control to permit rapid opening and a definite contact closing time delay of 1.0 second. In Fig. 2 at 24 is shown a dash pot control. Other forms of controls may be substituted to regulate the speed of movement of the relay contacts when opening and closing.

In order to provide a maximum degree of safety, relay 12 should be set to operate for steady currents only slightly in excess of the ultimate safe sustained current G (Fig. 7), i. e., the final or permanent current developed with the relay contacts reset in the closed position and with the fence terminals 9 and 11 short circuited. This is to insure relay operation on very high contact and ground return circuit resistances; and to prevent unnecessary relay operations and accompanying wear and tear due to pumping action. If the relay were set to operate on steady currents less than this value, unnecessary relay pumping would result from accidental short circuits between the fence wire and grounded objects.

The next step is the proper selection of the ultimate sustained current G. Here there are several considerations: Due regard must be given to the probable safe let-go current of a two year old child on the assumption that he may fail to release himself from the fence wire during the off-period provided by the relay; or that for some unforeseen reason the relay contacts remained in the closed position and the current went from B directly to G value. The ultimate sustained current G is based on the conservative assumption of body, contact and ground circuit resistance of 500 ohms. The safe-let-go-current curve for children shown in Fig. 6 indicates a maximum safe direct current of 30 milliamperes. Due regard must also be taken to allow for reasonable leakage currents in order to obtain effective control of cattle under the ordinary conditions found to exist in the field. The maximum leakage current of course should not be excessive to keep the power loss and hence the operating cost to a reasonable figure. It is believed that the direct current component in the ultimate safe sustained current G should be limited so as not to exceed 15 to 25 milliamperes. With E, C and R fixed as discussed above, the ultimate sustained current G is now controlled by impeder 7.

The proper impedance of impeder 7 is best selected by actual measurement and adjustment on the unit after the other circuit elements have been set as discussed in the foregoing. Having tentatively selected a reasonable value for the ultimate sustained current G, it is also necessary to measure both the crest value of the alternating current component and the direct current component to be sure that the D. C. and A. C. components of the output current G of Figs. 7 and 8 are within the limits of the Safe-let-go-current curve for children, as shown in Fig. 6, when fence terminals 9 and 11 are connected through a 500 ohm non-inductive resistor.

Compliance with the Safe-let-go-current curve is accomplished by proper selection of the ratio of inductance to resistance in impeder 7, or by increasing the resistance of impeder 7 with a reduction in the ultimate sustained current G, or by changes in the other circuit elements.

The setting of impeder 7, determined above, determines the maximum power and the maximum effectiveness of the controller during times of abnormally high leakage. If impeder 7 is provided with taps (see Fig. 2) so that higher values of impedances may be used, considerable gain in economy of operation may result in the event the fence becomes accidentally short circuited during otherwise more favorable operating conditions. A switch 22 may be provided, as indicated in Fig. 2, to permit adjustments to be made in the field to obtain desired operating conditions. Increasing the impedance of impeder 7 decreases both the D. C. and A. C. components in the sustained current G. Although the A. C. and D. C. components in the sustained current G should be measured and compared to the safe values of Fig. 6 for each switch position, it is believed that a position corresponding to maximum current is the most important from a safety standpoint and currents obtained from using higher resistance settings provided by the switch should automatically give results conforming with the safe values of Fig. 6.

The very low sustained shock current D, i. e., the sustained current developed with the contacts blocked open in relay 12, must be limited to 3 milliamperes (as specified by the most conservative safety code). This is accomplished by selection of impeder 13 with impeder 7 set for maximum current position, and with the fence terminals 9 and 11 short circuited through a 500 ohm non-inductive resistor. The A. C. and D. C. components of shock current D must then be checked with the safe-let-go-current curve for children. (See Fig. 6.)

With the various circuit elements adjusted as specified in the foregoing description, a final check is made to determine that the discharge from the controller is non-oscillatory. This is necessary, since the inductance of the coil in relay 12 together with condenser 8 might be such as to cause an oscillatory discharge instead of producing single impulse B, and thereby create objectionable radio interference. This check is best made by taking an oscillogram of the output current with fence terminals 9 and 11 connected through a low resistance shunt on the current element of an ordinary oscillograph.

If the circuit elements are chosen with regard to the range of values suggested in this description, and impeder 10 is a non-inductive resistance, it is believed that the circuit resistance will be above the critical value for oscillation, and no trouble is anticipated from this source. In the event the discharge is oscillatory, the difficulty may be eliminated by decreasing the inductance of relay 12 and/or increasing resistance of impeder 10.

The following pertain to safety features of my invention and how it minimizes the effects of failures of the controller due to ordinary wear and tear or tampering:

The condenser 8 performs three functions. First, it provides a stored up source of energy for the impulse shock B. Second, as the impulse decreases, filtering action takes place and the A. C. component (i. e., A. C. ripple) of the output current G and D is reduced to a safe value. Third, in the event a short circuit occurs in either the transformer or vacuum tubes, the condenser acts as a low impedance shunt and assists the impeders 7 and 10 in limiting the output current to wire 20 to a safe value.

When a two-tube full wave rectifier is used, the filaments of the two-tubes preferably should be connected in series to prevent operation should one tube be removed or a filament failure occur.

What I desire to claim is:

1. An electric fence comprising a normally open electric circuit; including a source of electric current; a bare fence wire insulated from ground; an uni-directional diode tube type rectifier having an anode and a cathode; a ground; a condenser connected between said ground and said bare fence wire; a connection between said cathode and said ground; and connections between said anode and said condenser and between said condenser and said bare fence wire; said connections including impeders, one between said anode and said condenser, and the other between said condenser and said bare fence wire.

2. An electric fence comprising a normally open electric circuit, including a source of electric current, a bare fence wire insulated from ground; an uni-directional diode tube type rectifier having anodes and cathodes; a ground; a condenser connected between said ground and said bare fence wire, a connection between said cathodes and said ground; and connections between said anodes and said condenser and between said condenser and said bare fence wire; said connections including impeders, one between said anodes and said condenser and the other between said condenser and said bare fence wire.

3. An electric fence charging means for use in combination with a bare fence wire insulated from ground and adapted to be grounded and a stored up charge released by an animal contacting the same, said means including a condenser in which a high direct current voltage charge is adapted to be built up; a condenser charging circuit including the condenser, a source of uni-directional pulsating current, the R. M. S. value of which is less than the voltage of the charge to be built up in the condenser, electrical connections between said source and the condenser, said connections including an impeder and a diode rectifier; and a shocking circuit constituting the sole means for discharging the condenser and including the condenser, the bare fence wire, ground, and an impeder between the bare fence wire and the condenser, said impeders together with the condenser safeguarding against the fence wire ever receiving the full power of the current source in the event of short circuiting of the rectifier, and said impeder in the shocking circuit controlling the intensity of discharge transmitted from the condenser to the fence wire while the latter is grounded.

4. In an electric fence: a bare fence wire insulated from the ground; a condenser, a relay switch; a direct current charging circuit for the condenser including a source of current effective to charge the condenser to a predetermined value, and in which the current ceases flowing when the condenser becomes charged to said value, and including the contact points of said relay; means for electrically connecting the fence wire with the condenser, said means including in the circuit the actuating coil of said relay, so that when the condenser is caused to discharge said relay will be actuated and will open the condenser charging circuit.

5. In an electric fence: a bare fence wire insulated from the ground; a condenser; a delayed action relay switch; a direct current charging circuit for the condenser including a source of current effective to charge the condenser to a predetermined value, and in which the current ceases flowing when the condenser becomes charged to said value, and including the contact points of said relay; means for electrically connecting the fence wire with the condenser, said means including in the circuit the actuating coil of said relay, so that when the condenser is caused to discharge said relay will be actuated and will open the condenser charging circuit for a time determined by the setting of said delayed action relay switch.

6. In an electric fence; a bare fence wire insulated from the ground; a condenser; a direct current charging circuit for the condenser, including a source of current effective to charge the condenser to a predetermined value, a relay switch having its contacts in said circuit, a shunt circuit around said switch, having an impeder therein, so that the condenser can begin to recharge prior to closing of said relay switch contacts; means for electrically connecting the fence wire with the condenser, said means including in the circuit the actuating coil of said relay, so that when the condenser is caused to discharge, said relay will be actuated and will open the relay contacts.

7. In an electric fence; a bare fence wire insulated from the ground; a condenser, a direct current charging circuit for the condenser, including a source of current effective to charge the condenser to a predetermined value, a relay switch having its contacts in said circuit, a delayed action mechanism operatively connected to said relay switch, a shunt circuit around said switch, having an impeder therein, so that the condenser can begin to recharge prior to closing of said relay switch contacts; means for electrically connecting the fence wire with the condenser, said means including in the circuit the actuating coil of said relay, so that when the condenser is caused to discharge, said relay will be actuated and will open the relay contacts, for a predetermined time interval.

8. In combination with a fence wire adapted to be electrically grounded through the body of an animal contacting the same, a current supply, means connected with the wire and adapted to store up a high value direct current electrical charge which is adapted to be spontaneously discharged and spent upon grounding of the wire through the body of the animal in contact with the wire, an impeder for limiting the current supply from said current storage means to the wire during grounding thereof, a second impeder for limiting the current supplied to said current storage means by said current supply, and a relay switch having its actuating coil actuated by the flow of current from said storage means to said fence wire, and having contact points which when open materially reduce the current being supplied the storage means by the first mentioned current supply and means for momentarily delaying the closing of said contact points.

CHARLES F. DALZIEL.